Dec. 20, 1966    K. HORN    3,293,585

EXPANSION BODY

Filed July 2, 1964    2 Sheets-Sheet 1

Dec. 20, 1966 K. HORN 3,293,585
EXPANSION BODY
Filed July 2, 1964 2 Sheets-Sheet 2
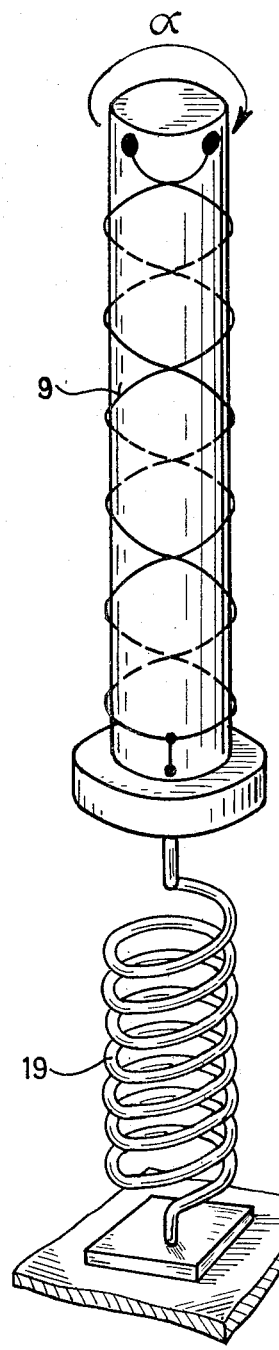
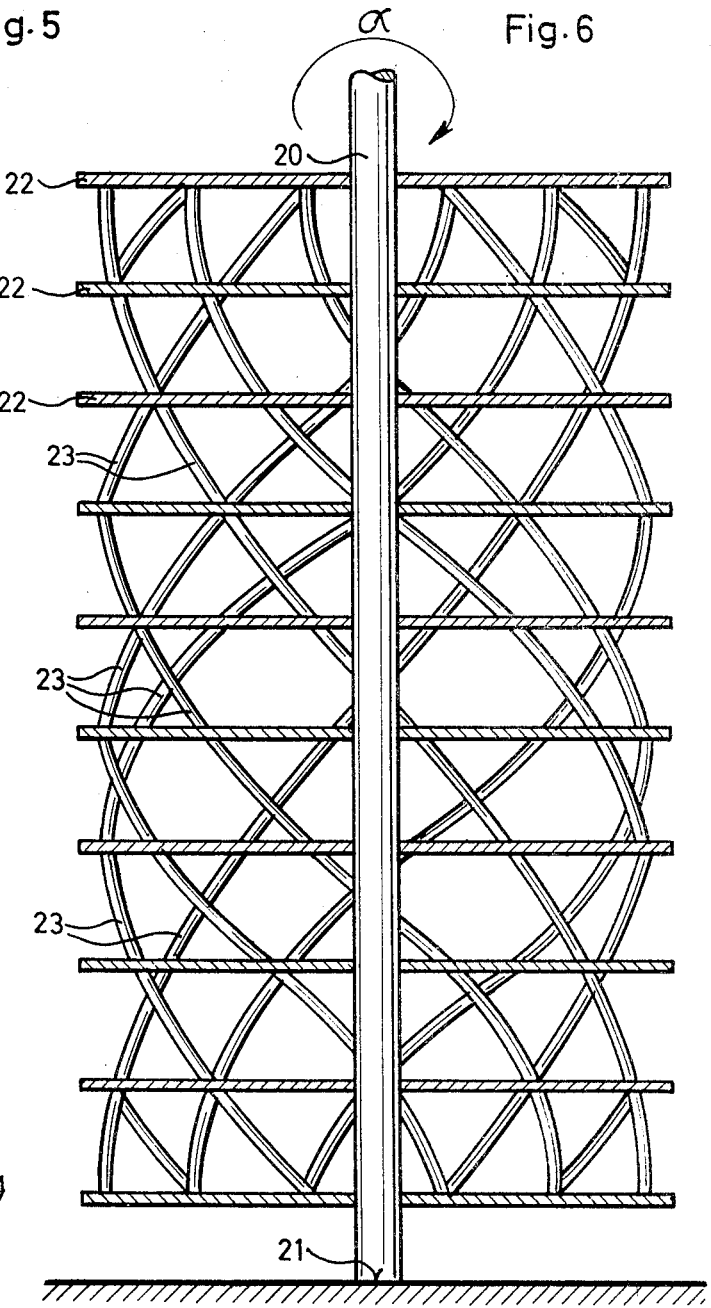

United States Patent Office 3,293,585
Patented Dec. 20, 1966

3,293,585
EXPANSION BODY
Klaus Horn, Karlsruhe, Germany, assignor to Siemens & Halske Aktiengesellschaft Berlin and Munich, a corporation of Germany
Filed July 2, 1964, Ser. No. 379,940
Claims priority, application Germany, July 8, 1963, S 86,050
7 Claims. (Cl. 338—6)

In self-balancing compensators it is a known practice to generate the compensation voltage with resistance elements which are sensitive to expansion or elongation, such elements being mounted, for this purpose, on bodies capable of expansion, which bodies are placed in a mechanically stressed state by the balancing motor or other power source of the compensator.

In compensators of the type described that have heretofore become known, as expansion bodies there were utilized bending springs or simple resistance wires which were exposed to tension stresses. The movement changes of the load applying point, necessary for the mechanical tensioning of the known expansion bodies are slight, and if simultaneously therewith it is desired that the deflection angle of the applied forces produce an indication scale or recorded displacement which is as great as possible, which problem as a rule is present in the case of compensators, the difference in the travel of the indicating or registering device and the changes in length of the expansion body must be derived over some kind of gearing. As the difference between the occurring two changes in length is considerable, the gearing becomes rather expensive and, through unavoidable gear lost motion or lag, are generally affected with certain faults.

The object of the invention, accordingly, is to provide a solution to such problem which is operable without gearing. The invention contemplates the utilization of an expansion body which is elastically deformable upon the application of a torque thereon and carries expansion-sensitive resistances. According to the invention the expansion body is characterized by a design such that the angle of rotation of a driving member is directly reflected therein in a polar-oriented tension stress.

An expansion body according to the invention eliminates the conversion necessary in known compensators of the rotary movement of the balancing motor into a transverse movement, such as can be achieved, for example, through the rotary movement of a balancing motor only through gearing. Moreover, it is easier with polar-oriented stresses to effect longer travel lengths than are possible with mere pull, push or bending stresses of simple expansion bodies.

One example of the invention consists primarily of a spiral spring, one end of which is rigidly secured and the other end of which is attached to a driving element which follows the angle of rotation, for example, of a balancing motor. On the outside and inside of the spiral spring, which may have a rectangular cross-section, expansion-sensitive resistances are disposed whose electric resistance value changes correspondingly to the stressed state of the spiral spring.

Another embodiment of the invention utilizes as the expansion body a torsion rod or bar securely held at one end. The bar may have a round cross-section and carry expansion-sensitive resistance elements which lie at 45° inclination to the rod axis which are securely mounted on the surface of the bar. Likewise, the torsion bar may also have a rectangular cross-section and expediently carry on its wide sides or faces expansion-sensitive resistances in a meandering arrangement. An especially great effect in the resistance change is achieved if the expansion-sensitive parts of the meandering loops follow those fibers of the bar which undergo a maximal expansion in the torsional movement. The torsion bar also may be of square cross-section and may in such case carry meandering loops on all four sides.

A torsion bar secured at one end, upon turning or twisting, tends to shorten. This creates a pull tension effect which can superimpose itself on the effect evoked through the torsion stress and may, under some circumstances, cause trouble. This defect can be eliminated by securing the fixed end of the torsion bar on the free end of a spiral or helical spring, which can absorb the shortening stresses of the torsion bar occurring in the twisting, so that no pull tension effect arises in the torsion bar. In addition, this arrangement also allows a greater angular deflection of the driver.

Another embodiment of the invention likewise proceeds from a relatively thin torsion bar on which at short intervals round disks of uniform diameter are evenly distributed over its length. Over the edges of the disks resistance wires are stretched along winding lines with a 45° pitch to the bar axis. Through the greater radius of the disks with respect to that of the torsion bar the angular twisting of the bar is translated into greater travel lengths, so that the effect exerted on the resistance wires is increased.

The expansion-sensitive resistances may in all the examples of the invention be simple resistance wires or so-called expansion measuring strips, which may be formed, in cases in which it appears especially expedient, in etched or printed technique.

It is also possible to form the expansion bodies of semiconductor monocrystals and to provide, as expansion-sensitive resistances, layers on the surface of such semiconductor bodies which have an opposite type of conductivity with respect to the base material.

The invention is explained with the aid of six schematic figures which represent respective embodiments of the invention, and in which:

FIG. 5 illustrates the utilization of a spring for mounting the expansion body; and FIG. 6 illustrates an embodiment of the invention utilizing a plurality of disks.

Figure 1:
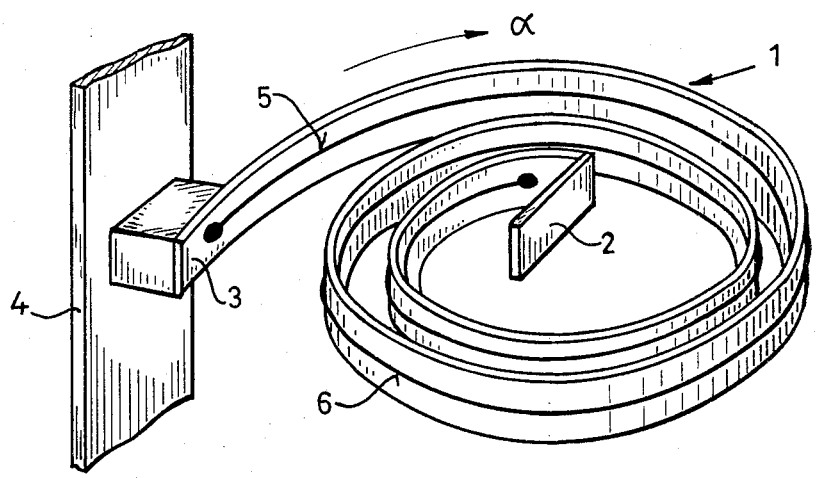
FIG. 1 illustrates an embodiment utilizing a spiral spring for the expansible body.

Referring to FIG. 1, there is illustrated a spiral spring 1, having a rectangular cross-section which is rigidly held, by suitable means, at its end 2, the other end 3 being deflected by a driving or actuating member 4 through a deflection angle α. As a result bending stresses occur in the spring which produce variations in the resistance value of expansion-sensitive resistance elements 5 and 6 on the outer and inner side of the spring proportional to the angular deflection.

Figure 2:
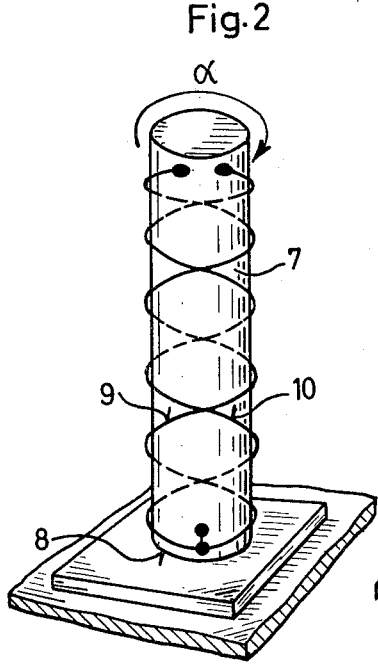
FIG. 2 illustrates an embodiment utilizing a bar of circular cross-section.

FIG. 2 illustrates a torsion bar 7, of circular cross-section, which is securely held at its end 8 and on its outer surface carries expansion-sensitive resistance elements 9 and 10. The resistance elements are disposed along lines corresponding to threads having a 45° pitch and are firmly secured to the surface of the bar. Here, too, the resistance value will change proportionally to a twist angle α of the torsion bar.

Figure 3:
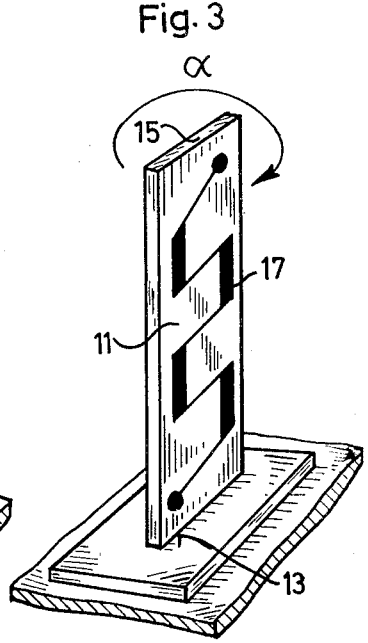
FIG. 3 illustrates an embodiment utilizing a bar of rectangular cross-section.
Figure 4:
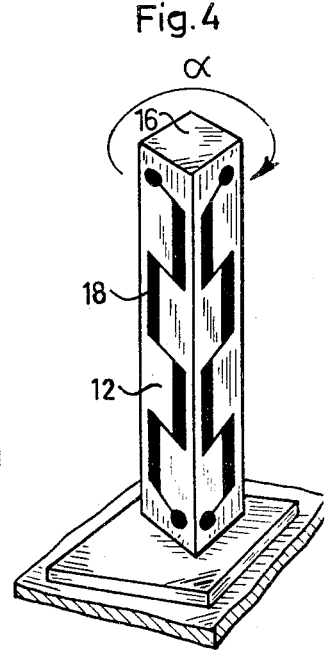
FIG. 4 illustrates an embodiment utilizing a bar of square cross-section.

In FIGS. 3 and 4, torsion bars 11 and 12 are illustrated which have rectangular and square cross-sections, respectively, with their corresponding ends 13 and 14 being rigidly supported, while ends 15 and 16 are deflected according to a rotary angle α. Expansion-sensitive resistances 17 and 18, respectively, are arranged in meandering loops on the side surfaces of the bars. The expansion-sensitive parts of these loops extend along those material fibers of the bars which in the case of a twisting thereof are maximally expanded. Such expansion-sensitive resistance elements, may for example, comprise expansion strips formed by etching or printing techniques.

Another example of the invention is illustrated in FIG. 6, wherein a torsion bar 20, which again is rigidly supported at one end 21, and with its free end can follow a deflection angle, carries individual disks 22 which are distributed over the length of the bar and rigidly connected therewith. Across the edges of the disks are freely tensioned resistance wires 23 arranged in a thread-like configuration at an inclination of 45°. The resistance wires are firmly secured to the disk edges and therefore follow every deflection of the disks. The expansion effect on the resistance wires thus is increased by the considerably greater diameter of the disks as compared to the diameter of the torsion bar.

Changes may be made within the scope and spirit of the appended claims which define what is believed to be new and desired to have protected by Letters Patent.

I claim:

1. An expansion element comprising a body in the form of a substantially flat, spiral spring having a plurality of turns positioned in the same plane suspended between a fixed mounting and a driving member and which is elastically deformable by torque acting thereon, expansion-sensitive resistances supported on surfaces of said body along a substantial length thereof in insulating relationship thereto, said resistances being so disposed on said body that rotation of one end of said body with respect to the other end, upon the application of torque forces thereto, is reflected directly in a polar oriented stress operative to effect a change in the resistance values of said resistances.

2. An expansion body according to claim 1 wherein said expansion-sensitive resistances are disposed on the inner and outer external surfaces of said spring.

3. An expansion body according to claim 1, wherein said body consists of a semiconductor monocrystal and the expansion-sensitive resistances are in the form of layers with conductivity opposite to the base material.

4. An expansion body according to claim 1, wherein the expansion-sensitive resistances are insulated and applied directly to said body.

5. An expansion body according to claim 1, wherein the expansion-sensitive resistances are expansion measuring strips and are insulated therefrom.

6. An expansion body according to claim 5, wherein the expansion-sensitive resistances are expansion strips of etched formation.

7. An expansion body according to claim 5, wherein the expansion-sensitive resistances are expansion strips of printed formation.

References Cited by the Examiner

UNITED STATES PATENTS

| | | | |
|---|---|---|---|
| 2,350,072 | 5/1944 | Simmons | 338—5 |
| 2,392,293 | 1/1946 | Ruge | 338—2 X |
| 2,393,714 | 1/1946 | Simmons | 338—6 |
| 2,470,714 | 5/1949 | Nevius | 338—40 X |
| 2,582,886 | 1/1952 | Ruge | 338—5 X |
| 2,703,935 | 3/1955 | Mead et al. | 338—2 X |
| 2,939,317 | 6/1960 | Mason | 73—88.5 X |
| 2,976,506 | 3/1961 | Bourns | 338—40 |
| 3,022,570 | 2/1962 | Taylor | 338—2 X |
| 3,035,223 | 5/1962 | Schantz | 338—2 X |
| 3,049,685 | 8/1962 | Wright | 338—2 |

RICHARD M. WOOD, *Primary Examiner.*

W. D. BROOKS, *Assistant Examiner.*